United States Patent
Bach et al.

(10) Patent No.: US 7,576,533 B2
(45) Date of Patent: Aug. 18, 2009

(54) INDUCTIVE ANGULAR-POSITION SENSOR

(75) Inventors: Guy Bach, Waldighoffen (FR); Bernard Dockwiller, Saint Bernard (FR)

(73) Assignee: Sappel, Saint Louis (FR)

( * ) Notice: Subject to any disclaimer, the term of this patent is extended or adjusted under 35 U.S.C. 154(b) by 0 days.

(21) Appl. No.: 11/885,862

(22) PCT Filed: Feb. 24, 2006

(86) PCT No.: PCT/FR2006/000425

§ 371 (c)(1),
(2), (4) Date: Nov. 13, 2007

(87) PCT Pub. No.: WO2006/095072

PCT Pub. Date: Sep. 14, 2006

(65) Prior Publication Data
US 2008/0164869 A1    Jul. 10, 2008

(30) Foreign Application Priority Data
Mar. 7, 2005    (FR) .................................. 05 02241

(51) Int. Cl.
*G01B 7/30* (2006.01)
(52) U.S. Cl. ............................. 324/207.25; 324/207.15
(58) Field of Classification Search ................
324/207.15–207.16, 207.25, 234, 239, 258;
73/514.16, 514.31, 514.39
See application file for complete search history.

(56) References Cited

U.S. PATENT DOCUMENTS 5,994,896 A  *  11/1999  Andreas et al.  ........  324/207.17
6,011,389 A        1/2000  Masreliez et al.

FOREIGN PATENT DOCUMENTS

DE    43 35 701 A1    4/1995
EP    1 122 520 A1    8/2001

OTHER PUBLICATIONS

Clausen Reimer, "Inductive Angle-Measuring Device", English Partial Translation of the document DE 4335701, Apr. 1995.*

* cited by examiner

*Primary Examiner*—Bot LeDynh
(74) *Attorney, Agent, or Firm*—Young & Thompson

(57) ABSTRACT

Inductive angular-position sensor, including a partially metallized disk that moves in rotation around its axis of revolution; and a stator that includes a primary coil and several secondary coils, whereby the secondary coils are arranged essentially symmetrically in pairs relative to the axis of revolution, so as to form one or more pairs of secondary coils, whereby the secondary coils of each pair are connected, on the one hand, to one another, in series and in phase opposition relative to one another, and, on the other hand, to the terminals of a measuring element that can generate an output signal that depends on the voltage at the terminals of the pair.

7 Claims, 2 Drawing Sheets

INDUCTIVE ANGULAR-POSITION SENSOR

BACKGROUND OF THE INVENTION

This invention has as its object an inductive angular-position sensor.

It is common to use a mechanical part that rotates based on the flow of a fluid so as to measure flow rate. In general, an angular-position sensor detects the rate of rotation of the rotating part so as to allow an electronic processing of the information. This invention is particularly suited to this application, although it is not limited thereto.

Several solutions are known for detecting an angular position.

A first solution uses magnetic sensors. The rotating part is then equipped with a small permanent magnet whose magnetic field actuates the electric contact of a Reed ampoule that is arranged in the vicinity. The switching of this electric contact is therefore representative of the flow of the liquid. Certain sensors rely on several ampoules to as to make it possible, for example, to detect the direction of rotation of the rotating part, therefore the flow direction of the fluid. These angular-position sensors have the drawback of being fragile because the Reed ampoule is made of glass. In addition, they are susceptible to fraud because a sufficiently powerful external magnetic field makes it possible to modify the behavior of the Reed ampoules.

SUMMARY OF THE INVENTION

A second solution uses capacitive sensors. The rotating part is then equipped with a partially metallized disk. In the vicinity of and parallel to this disk, a special arrangement of metallized zones, whose different capacitive couplings vary based on the position of the disk, is found. The observation of these capacitive couplings makes it possible to detect the rotation of the rotating part, therefore the flow of the fluid. According to the arrangement of these metallized zones, it is also possible to detect the direction of rotation of the rotating part, therefore the flow direction of the fluid. The capacitive sensors have the drawback of having to be very close to the rotating disk. In addition, they are easily disturbed by any geometric change or any variation of what is found between the rotating disk and the sensor.

A third solution uses inductive sensors. The rotating part is equipped with a partially metallized disk. Close to this disk, there is an LC-type oscillating circuit (capacitor coil) whose damping depends on the distance between the coil L and the metallized zone through which travel the Foucault currents generated during the oscillation. The observation of this damping makes it possible to detect the rotation of the rotating part, therefore the flow of the fluid. The use of several coils can make it possible, for example, also to detect the direction of rotation of the rotating part, therefore the flow direction of the fluid. The inductive sensors have drawbacks of having a relatively high cost and electrical consumption.

This invention has as its object to propose an inductive angular-position sensor that avoids at least some of the above-mentioned drawbacks, which is not very sensitive to installation conditions, is resistant to fraud attempts, and is economical.

For this purpose, the invention has as its object an inductive angular-position sensor, comprising:

A partially metallized disk that moves in rotation around its axis of revolution; and A stator that comprises a primary coil, with an axis that is essentially merged with said axis of revolution, designed to be fed by a feeding means, and several secondary coils that are arranged so as to allow an inductive coupling between said primary coil and said secondary coils, characterized in that the axis of each secondary coil is essentially parallel to said axis of revolution, whereby said secondary coils are arranged in pairs that are essentially symmetrical relative to said axis of revolution, so as to form one or more pairs of secondary coils, whereby said secondary coils of each pair are connected, on the one hand, to one another, in series and in phase opposition relative to one another, and, on the other hand, to the terminals of measuring means that can generate an output signal that depends on the voltage at the terminals of said pair.

The sensor preferably comprises two pairs of secondary coils, whereby said secondary coils are distributed uniformly around said axis of revolution.

According to a characteristic of the invention, said feeding means is a pulse generator.

According to an embodiment of the invention, said measuring means comprises a comparator that is combined with each pair.

According to another embodiment of the invention, said measuring means comprises a quantitative measuring means that is combined with each pair, whereby said quantitative measuring means is combined with a processing means.

According to an embodiment of the invention, said primary coil surrounds said secondary coils.

Said partially metallized disk is preferably metallized on a surface that corresponds to a half-disk.

Advantageously, said primary coil and said secondary coils are made on a printed circuit.

BRIEF DESCRIPTION OF SEVERAL VIEWS OF THE DRAWINGS

The invention will be better understood, and other purposes, details, characteristics and advantages of the latter will emerge more clearly during the following detailed explanatory description of an embodiment of the invention that is provided by way of purely illustrative and nonlimiting example, with reference to the accompanying diagrammatic drawings.

In these drawings.

DETAILED DESCRIPTION OF THE PREFERRED EMBODIMENTS

Figure 1:
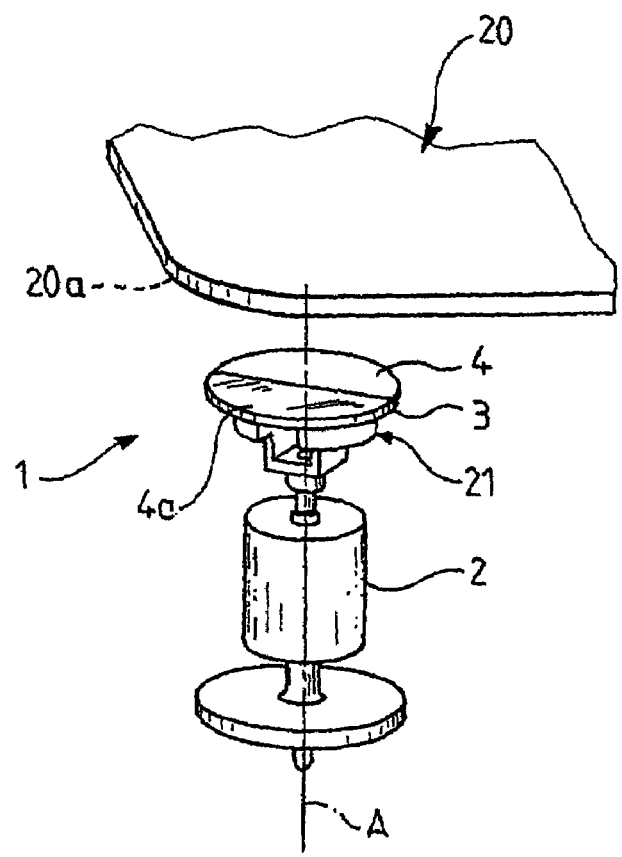
FIG. 1 is a diagrammatic perspective view that shows an inductive angular-position sensor according to an embodiment of the invention.

With reference to FIG. 1, a rotating moving body 2 is shown that is driven in rotation along its axis of revolution A, for example by the flow of a fluid (not shown). An inductive angular-position sensor 1 comprises a stator 20 and a rotor 21. The stator 20 and the rotor 21 can be moved angularly relative to one another along axis A. It will be noted that the use of the term stator does not imply that the stator 20 has a fixed orientation.

The rotor 21 comprises a rotating disk 3. The rotating disk 3 is arranged on the rotating moving body 2, such that the rotating disk 3 is integral in rotation along axis A of the rotating moving body 2. The flat surface 4 of the disk 3 that is opposite to the rotating moving body 2 is partially metallized. For example, a half-disk 4a is metallized.

Figure 2:
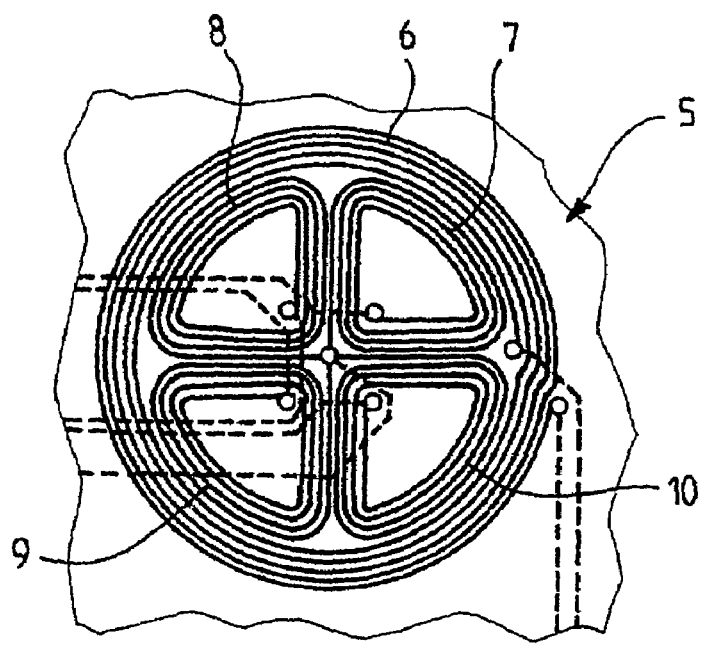
FIG. 2 is a diagrammatic view of the printed circuit of the sensor of FIG. 1.

The stator 20 comprises a printed circuit 5 (FIG. 2). The printed circuit 5 is arranged at the right and close to the disk 3, essentially parallel to the surface 4.

Figure 3:
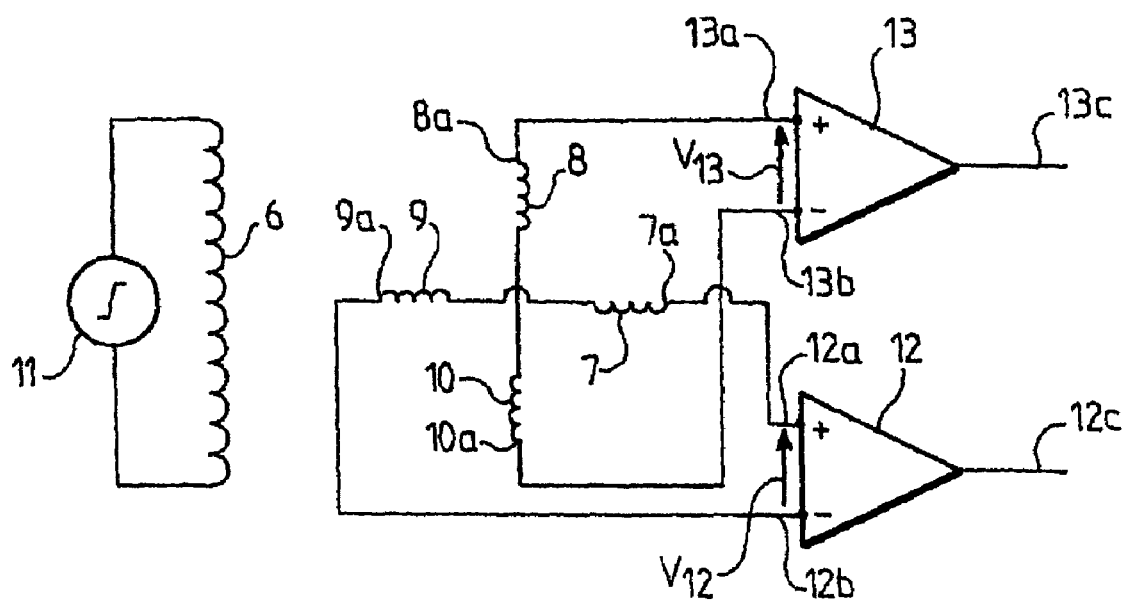
FIG. 3 is an electric diagram of the printed circuit of FIG. 2.
Figure 4:
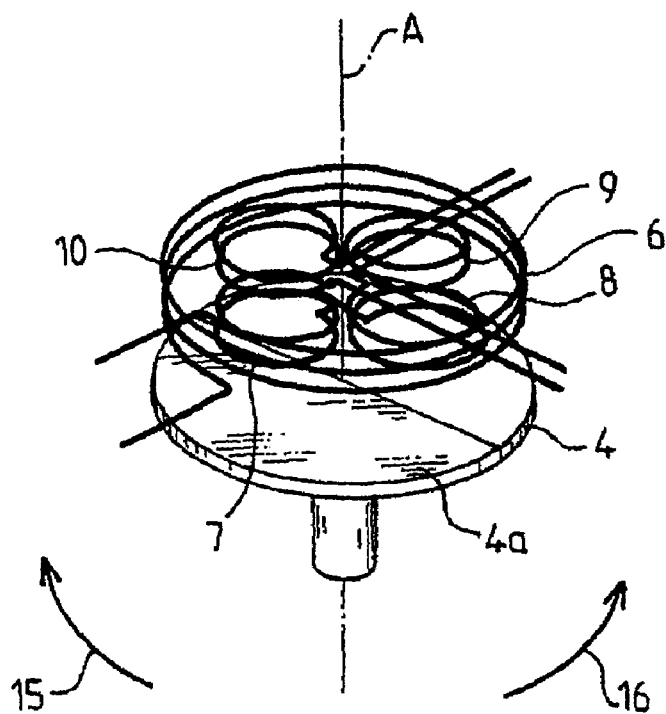
FIG. 4 is a diagrammatic perspective view of the sensor of FIG. 1 that shows the rotating disk, the primary coil and the secondary coils.

With reference to FIGS. 2 and 3, the printed circuit 5 will now be described. The printed circuit 5 is arranged on the face 20a of the stator 20 that faces the surface 4. The printed circuit 5 comprises a primary coil 6. For example, the primary coil comprises five turns. Four secondary coils 7, 8, 9 and 10 are arranged inside the primary coil 6. The secondary coils 7, 8, 9 and 10 are identical and comprise, for example, four turns each. In a variant that is shown in FIG. 4, the primary coil 6 comprises three turns and each secondary coil comprises two turns. The printed circuit 5 is arranged relative to the disk 3 such that the axis of the primary coil 6 is merged with the axis A, whereby the axis of each secondary coil 7, 8, 9 and 10 is at this time essentially parallel to the axis A. The secondary coils 7, 8, 9 and 10 are uniformly distributed around the axis A.

The primary coil 6 is fed by a pulse generator 11. Whereby the useful information output from the four coils 7, 8, 9 and 10 is immediately present, as will be described in detail later, the duration of each pulse may be relatively short. For example, the duration of a pulse is on the order of several nanoseconds, which makes it possible in particular to minimize current consumption in the primary coil 6. It will be noted that such a sensor 1 is particularly resistant to fraud attempts because the measurement lasts only for a few nanoseconds.

The secondary coils 7, 8, 9 and 10 are coupled in pairs 7 and 9 (or 8 and 10), whereby the coils of each pair are mounted in series and in phase opposition. The end 7a of the coil 7 that is not connected to the coil 9 is connected to a positive input 12a of a comparator 12. The end 9a of the coil 9 that is not connected to the coil 7 is connected to a negative input 12b of the comparator 12. The end 8a of the coil 8 that is not connected to the coil 10 is connected to a positive input 13 a of a comparator 13. The end 10a of the coil 10 that is not connected to the coil 8 is connected to a negative input 1 3b of the comparator 13. The comparators 12 and 13 are voltage comparators. The value of the output 12c (or 13c) of the comparator 12 (or 13) is based on the voltage $V_{12}$ (or $V_3$) between its inputs 12a and 12b (or 13a and 13b). It will be noted that the fact of connecting the secondary coils 7, 8, 9 and 10 in differential mode ensures excellent rejection of external disruptive magnetic fields that may exist, which contributes to reducing the risk of fraud.

The operation of the sensor 1 will now be described.

When a pulse is applied to the primary coil 6, the latter creates a magnetic excitation field that passes through the four coils 7, 8, 9 and 10. Whereby it will be noted that the coils 7, 8, 9 and 10 are arranged in a similar manner relative to the coil 6, the amplitude of the magnetic excitation field that passes through each coil 7, 8, 9 and 10 is identical. The magnetic excitation field also reaches the metallized half-disk 4a. This has the effect of generating Foucault currents on the half-disk 4a. These Foucault current generate an opposite magnetic field that opposes the magnetic excitation field.

In a first step, it is considered that when the pulse is generated, the metallized half-disk 4a is found just below the coil 7 (FIG. 4). At this time, each coil 7, 8, 9 and 10 is passed through by a magnetic field that results from the sum of the magnetic excitation field and the opposite magnetic field that pass through it. Whereby the coil 7 is to the right of the half-disk 4a, the opposite magnetic field that passes through it has a low, but non-negligible amplitude. The resulting magnetic field that passes through the coil 7 is therefore slightly less strong than the magnetic excitation field. Whereby the coil 9 is the secondary coil that is farthest from the half-disk 4a, the amplitude of the opposite magnetic field that passes through it is much lower, for example essentially equal to zero, than the amplitude of the magnetic excitation field that passes through the coil 9. The resulting magnetic field that passes through the coil 9 is therefore essentially equal to the magnetic excitation field. Whereby the coils 8 and 10 are arranged symmetrically relative to the half-disk 4a, they are passed through by a resulting magnetic field of the same amplitude. The resulting magnetic fields that pass through the coils 7, 8, 9 and 10 generate voltages that are induced in the coils 7, 8, 9 and 10, whereby each induced voltage is based on the associated resulting magnetic field. The voltages that are induced in the coils 7 and 9 (or 8 and 10) determine the amplitudes and signs of the voltages $V_{12}$ and $V_{13}$. The outputs 12c and 13c can assume several values based on the amplitudes and signs of the voltages $V_{12}$ and $V_{13}$.

Whereby the voltages that are induced in the coils 8 and 10 are equal and the coils 8 and 10 are mounted in phase opposition, the voltage $V_{13}$ is essentially zero. Whereby the voltage that is induced in the coil 7 is less than the voltage that is induced in the coil 9, the voltage $V_{12}$ is therefore negative. The output 13c is therefore zero and the output 12c is negative. It will be noted that it is a mounting example and that the sensor 1 would operate in a similar manner with reversed coils 7, 8, 9 and 10.

When the half-disk 4a rotates by ⅛ turn, so that it is under the coils 7 and 10 when a pulse is generated, the opposite magnetic field that is generated by the half-disk 4a in response to a pulse of the coil 6 passes through the coils 7 and 10 in an identical manner. It will be noted that, as has been described above, the magnetic excitation field passes through the four coils 7, 8, 9 and 10 in an identical manner. The resulting magnetic fields that pass through the coils 7 and 10 are therefore identical. In the same way, the resulting magnetic fields that pass through the coils 8 and 9 are identical. The induced voltages therefore have the same value in the coils 7 and 10, on the one hand, and in the coils 8 and 9, on the other hand. The voltages $V_{12}$ and $V_{13}$ therefore have the same amplitude. In the mounting example of FIG. 3, the voltages $V_{12}$ and $V_{13}$ have opposite signs, whereby $V_{12}$ is negative and $V_{13}$ is positive, because of the differential effect.

When the half-disk 4a again rotates by ⅛ turn, it is just below the coil 10. At this time, in a manner. that is similar to the case where the half-disk 4a is under the coil 7, an essentially zero voltage $V_{12}$ and a positive voltage $V_{13}$ are obtained. The output 12c is therefore zero, and the output 13c is positive.

When the half-disk 4a also rotates by ⅛ turn, so that it is below the coils 10 and 9, the voltage $V_{12}$ and the voltage $V_{13}$ have the same amplitude and the same sign. With each pulse, the sensor 1 measures the voltages $V_{12}$ and $V_{13}$ in the same manner.

When the disk 3 rotates, the frequency of the signals of outputs 12c and 13c makes it possible to determine the rate of rotation of the disk 3, therefore the flow of the fluid. In addition, the curves of the output 13c as a function of time and the output 12c as a function of time are in quadrature. This makes it possible to determine the direction of rotation of the moving body 2, by determining what curve is ahead of the other, i.e., by comparing the amplitude and the sign of the outputs 12c and 13c. In the example of FIG. 3, when the moving element 2 rotates in the clockwise direction, shown by the arrow 15, the output curve 13*c* is ahead of the output curve 12*c*, and when the moving body 2 rotates in the trigonometric direction, shown by the arrow 16, the output curve 12*c* is ahead of the output curve 13*c*.

Other variants are possible. For example, there can be any number of turns of the coils.

A single pair of secondary coils can be provided; in this case, the sensor does not make it possible to detect the direction of rotation of the moving body.

The generator that feeds the primary coil can generate a signal of any shape, for example an alternating signal.

It will be noted that the relative positioning of the different elements of the sensor relative to one another is not essential, whereby any difference in positioning brings about a constant offset in the detected signal, and whereby such an offset is very easy to correct.

The comparators generally comprise an offset on the order of about 10 millivolts. When the signal is weak, for example on the order of 2-3 millvolts, which may be a result of the distance of the disk relative to the coils, a means for measuring the voltage at the terminals of the pairs of coils is used instead of the comparator, so as to obtain a quantitative value of the voltage, whereby this value is then processed by a processing means, for example software or electronic means, so as to separate the signal from the offset.

Although the invention was described in relation to several particular embodiments, it is quite obvious that it is in no way limited thereto and that it comprises all the technical equivalents of the means described as well as their combinations if the latter enter within the scope of the invention.

The invention claimed is:

1. An inductive angular-position sensor, comprising:
   a partially metallized disk (3) that moves in rotation around the axis of revolution (A) of the disk;
   a feeding means (11); and
   a stator that comprises a i) primary coil (6), with a second axis that is essentially merged with said axis of revolution, connected to the feeding means (11), and ii) several secondary coils (7, 8, 9, 10) configured to allow an inductive coupling between said primary coil and said secondary coils,
   wherein an axis of each of the secondary coils is essentially parallel to said axis of revolution,
   wherein said secondary coils are arranged in pairs essentially symmetrical relative to said axis of revolution, so as to form one or more pairs of secondary coils,
   wherein said secondary coils of each pair are connected i) to one another both in series and in phase opposition relative to one another, and ii) to terminals of a measuring means (12, 13) configured to generate an output signal depending on a voltage at the terminals, and
   wherein said feeding means (11) is a pulse generator, and wherein the primary coil (6) and the secondary coils (7, 8, 9, 10) occupy a same plane.

2. The sensor according to claim 1, wherein said secondary coils form two pairs of secondary coils (7, 8, 9, 10), and
   wherein said secondary coils are distributed uniformly around said axis of revolution (A).

3. The sensor according to claim 1, wherein said measuring means comprises a comparator (12, 13) combined with each pair.

4. The sensor according to claim 1, wherein said measuring means comprises a quantitative measuring means associated with each pair, and
   wherein said quantitative measuring means is combined with a processing means.

5. The sensor according to claim 1, wherein said primary coil surrounds said secondary coils.

6. The sensor according to claim 1, wherein said partially metallized disk is metallized on a surface that corresponds to a half-disk (4*a*)

7. The sensor according to claim 1, wherein said primary coil and said secondary coils are made on a printed circuit.

* * * * *